(12) United States Patent
Holmes et al.

(10) Patent No.: US 6,314,720 B1
(45) Date of Patent: Nov. 13, 2001

(54) ROCKET COMBUSTION CHAMBER COATING

(75) Inventors: Richard R. Holmes, Guntersville; Timothy N. McKechnie, Brownsboro, both of AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/490,290

(22) Filed: Jan. 19, 2000

(51) Int. Cl.[7] .................................................... F02K 9/00
(52) U.S. Cl. ............................. 60/257; 60/271; 29/890.01
(58) Field of Search ................ 60/257, 271; 239/265.11; 29/890.01

(56) References Cited

U.S. PATENT DOCUMENTS

| | | | | |
|---|---|---|---|---|
| 3,250,070 | * | 5/1966 | Milewski | 60/35.6 |
| 6,164,060 | * | 12/2000 | Myers | 60/253 |

* cited by examiner

*Primary Examiner*—Timothy S. Thorpe
*Assistant Examiner*—Ehud Gartenberg
(74) *Attorney, Agent, or Firm*—Jerry L. Seemann

(57) ABSTRACT

A coating with the ability to protect (1) the inside wall (i.e., lining) of a rocket engine combustion chamber and (2) parts of other apparatuses that utilize or are exposed to combustive or high-temperature environments. The novelty of this invention lies in the manner a protective coating is embedded into the lining.

22 Claims, 5 Drawing Sheets

ROCKET COMBUSTION CHAMBER COATING

CROSS-REFERENCE TO A RELATED APPLICATION

This application for patent is an original application and does not claim the benefit of any other previously filed application.

STATEMENT REGARDING FEDERALLY-SPONSORED RESEARCH OR DEVELOPMENT

The invention described in this patent was made with government support under contract NAS8-97240 awarded by the National Aeronautics and Space Administration. The Contractor has certain rights in this invention.

BACKGROUND OF THE INVENTION

1. Field of the Invention

In general, this invention pertains to rocket engines. Specifically, this invention pertains to a protective coating for the combustion chamber of a liquid-fueled rocket engine.

Although this invention was developed for rocket engines, the invention has application to parts of other apparatuses that utilize or are exposed to combustive or high-temperature environments (i.e., jet engines, gas turbines, incinerators, furnaces, heat exchangers, reactors, welders, etc.).

2. Background Information

The combustion chamber of a rocket engine is exposed to a very intense environment of heat and pressure during operation. In fact, the life of a rocket engine is highly dependent upon the ability of a combustion chamber to withstand the violent, combustive environment. Like many other high performance applications, several materials are combined to meet the demanding fabrication and performance requirements associated with a combustion chamber. For example, good thermal conductance is needed to keep the combustion chamber from getting too hot, and resistance to thermal corrosion and oxidation is needed to ensure a reasonable life expectancy of the chamber itself. A method of protecting the inside wall (i.e., lining) of a combustion chamber from thermal corrosion and oxidation consists of providing a thin protective coating on the lining of the combustion chamber. However, even with special intermediate adhesive or bond coatings, the protective coating has a strong tendency to delaminate in the combustive environment.

SUMMARY OF THE INVENTION

This invention has the ability to protect the inside wall (i.e., lining) of a rocket engine combustion chamber from the adverse effects of heat and oxidation. The novelty of this invention lies in the manner a protective coating is embedded into the lining.

An object of this invention is to protect the combustion chamber of a liquid-fueled rocket engine from the deleterious effects of thermal corrosion and oxidation.

Another object of this invention is to provide a protective coating for the combustion chamber of a rocket engine that is more durable than conventional coatings, and consequently, that extends the life of the rocket engine.

Still another object of this invention is to provide an insulative coating (i.e., thermal barrier) for the combustion chamber of a rocket engine that lowers the operating temperature of the combustion chamber and thereby extends the life of the rocket engine.

A further object of this invention is to provide a protective coating for parts of apparatuses that utilize or are exposed to combustive or high-temperature environments in order to protect such parts from corrosion associated with extreme heat and/or oxidation.

BRIEF DESCRIPTION OF THE DRAWINGS

The following discussion of the invention will refer to the accompanying drawings in which.

DESCRIPTION OF THE PREFERRED EMBODIMENT

Figure 1:
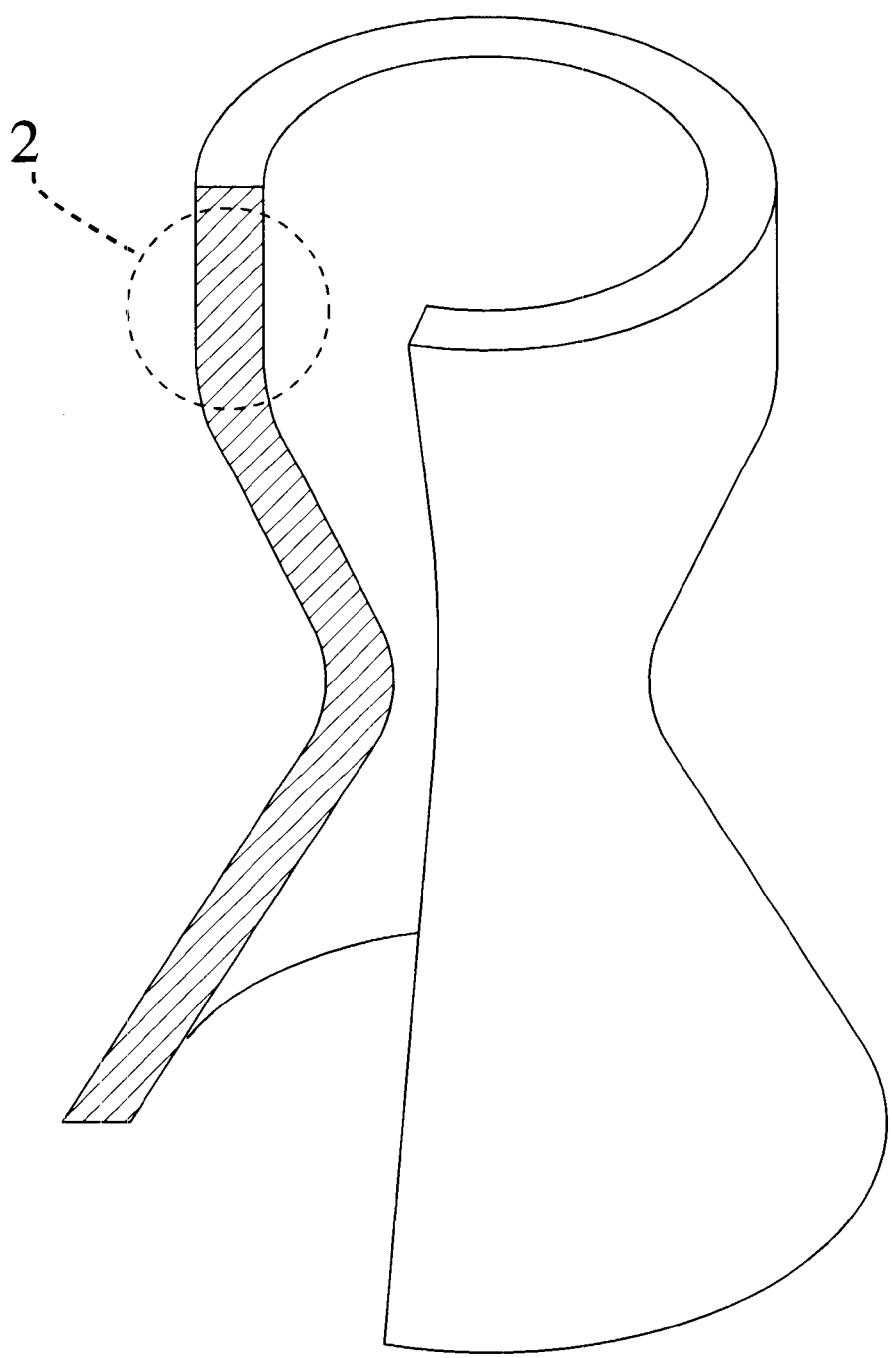
FIG. 1 is both an isometric view and a partial, cross-sectional view of a typical combustion chamber lining belonging to a liquid-fueled rocket engine.
Figure 2:
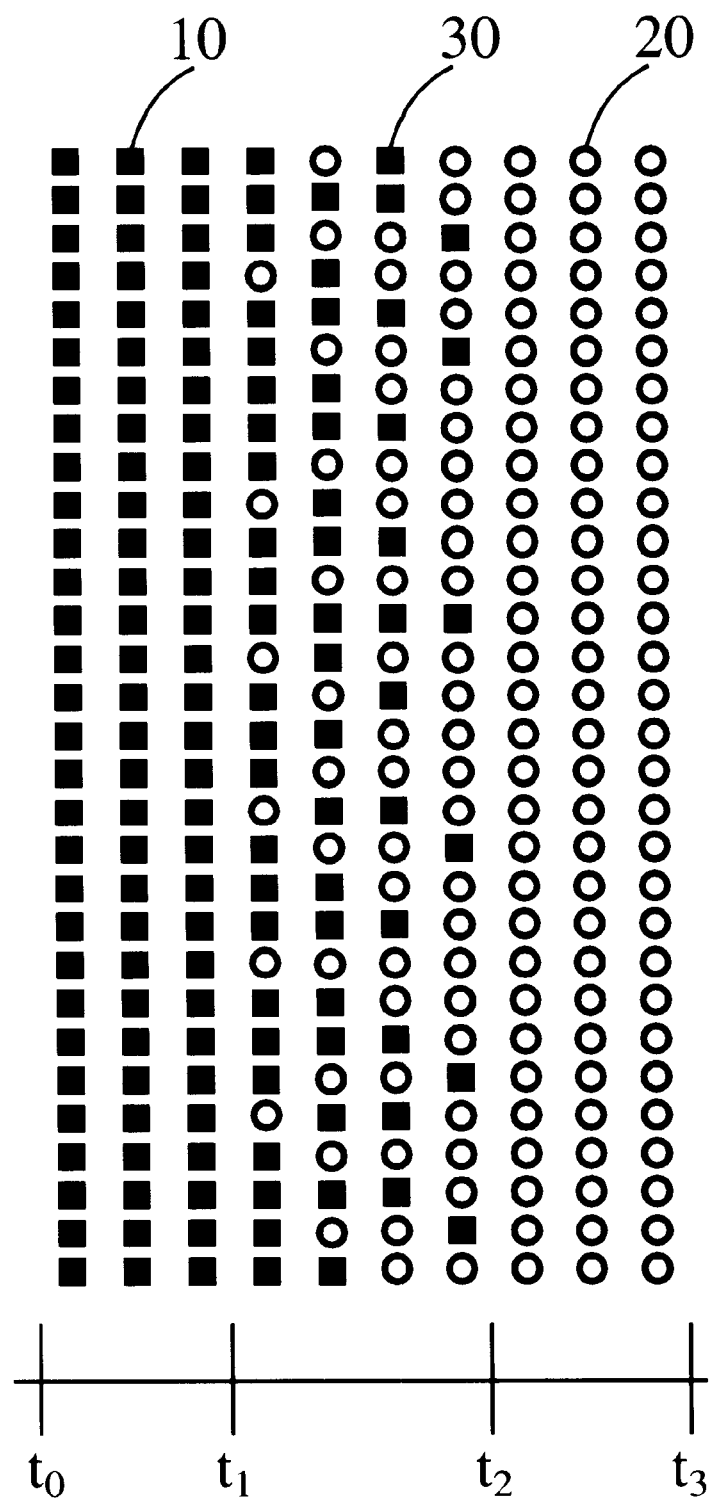
FIG. 2 represents an enlarged and symbolic cross-sectional view of the combustion chamber lining from section 2 of FIG. 1 and demonstrates how the protective coating and lining are interlocked together in accordance with the present invention.

Referring to FIGS. 1 and 2, a preferred embodiment of this invention comprises a combustion chamber lining (10), a first protective coating (20), and a first transitional layer (30) that gradiently interlocks the combustion chamber lining (10) with the first protective coating (20).

The lining (10) of the combustion chamber can be fabricated from a variety of metallic materials. For example, any copper alloy within the following limitations would be suitable for the lining (10):

60 to 100 percent by weight copper (Cu)
0 to 30 percent by weight chromium (Cr)
0 to 10 percent by weight niobium (Nb)
0 to 4 percent by weight silver (Ag)
0 to 1 percent by weight zirconium (Zr)

A preferred lining can be fabricated from a copper alloy such as Cu—8Cr—4Nb. Other lining materials include rhenium, stainless steel, and nickel-based alloys.

The first protective coating (20) can also be fabricated from a variety of materials including metals and ceramics. A typical metallic coating is $R_1$CrAlY where $R_1$ is selected from the group consisting of nickel (Ni), cobalt (Co), iron (Fe), or a combination thereof. Any $R_1$ alloy within the following limitations would be suitable for the first protective coating (20):

0 to 80 percent by weight $R_1$
15 to 35 percent by weight chromium (Cr)
5 to 15 percent by weight aluminum (Al)
0.1 to 1 percent by weight yttrium (Y)

A preferred R1-alloy is Ni—17Cr–6Al—0.5Y. Other metallic materials include stainless steel, nickel-based alloys, iridium, and Cu—30Cr.

As stated, the first protective coating (20) can also consist of a ceramic. A typical ceramic is zirconium oxide ($ZrO_2$) that has been stabilized with yttrium oxide ($Y_2O_3$). A preferred ceramic coating is $ZrO_2$—$8Y_2O_3$. Other ceramic coatings include mullite, alumina, zircon, hafnium carbide, hafnium diboride, and hafnium nitride.

The first transitional layer (30) consists of a unique mixture of the lining (10) and the first protective coating (20). In one direction across the first transitional layer (30) (i.e., moving from the lining to the coating), the proportion of the lining (10) decreases on a gradient and the proportion of the first protective coating (20) increases on a gradient. In the other direction across the first transitional layer (30) (i.e., moving from the coating to the lining), the proportion of the lining (10) increases on a gradient and the proportion of the first protective coating (20) decreases on a gradient.

Figure 3:
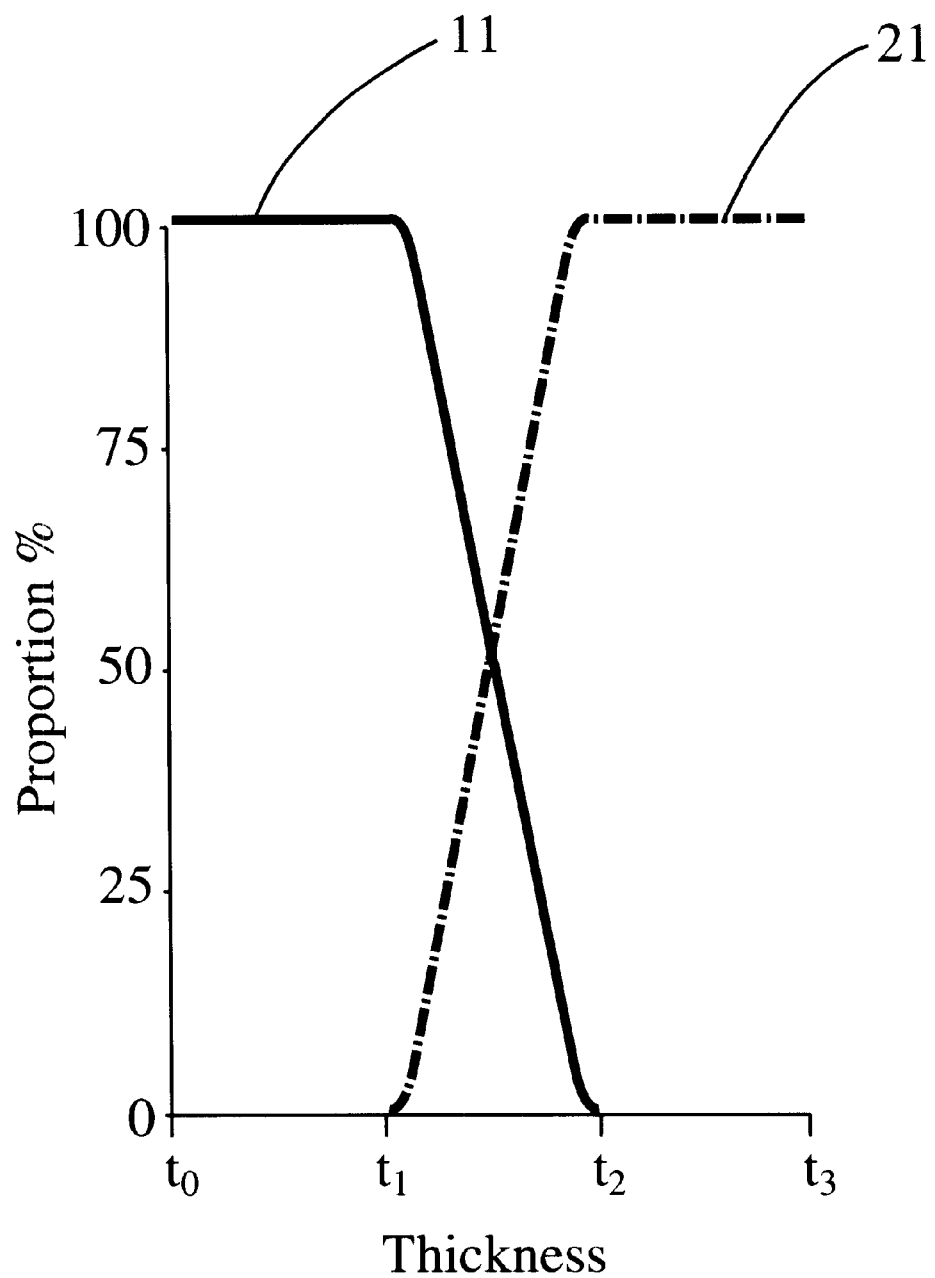
FIG. 3 is a graph showing how the proportions of materials associated with the combustion chamber lining and the protective coating change throughout the first transitional layer in accordance with the present invention.

FIG. 3 is a graphical representation showing how the proportions of the two materials associated with lining (10) and the first protective coating (20) change in the first transitional layer (30). The x-axis represents the thickness or depth of both the lining (10) and the first protective coating (20). The thickness of the lining (10) is represented by ($t_0$–$t_1$) on the x-axis, the thickness of the first protective coating (20) is represented by ($t_2$–$t_3$) on the x-axis, and the thickness of the first transitional layer (30) is represented by ($t_1$–$t_2$) on the x-axis. The y-axis simply represents proportion in percent. A first curve (11) represents various proportions of the lining (10) in the preferred embodiment and a second curve (21) represents various proportions of the first protective coating (20) in the preferred embodiment.

Continuing to refer to FIG. 3, the lining (10) and the first protective coating (20) are interlocked together in the first transitional layer (30). The first transitional layer (30) distinguishes the present invention over the prior art. In the first transitional layer (30), the presence of the lining (10) corresponds to a generally negative or decreasing gradient from $t_1$ to $t_2$ and the presence of the first protective coating (20) corresponds to a generally positive or increasing gradient from $t_1$ to $t_2$. As indicated, even though the respective gradients will always be positive or negative, the gradients d o not have to be constant ( i.e., straight-line) gradients. In addition, the first transitional layer (30) can vary in thickness from a fraction of a millimeter to several millimeters.

Figure 4:
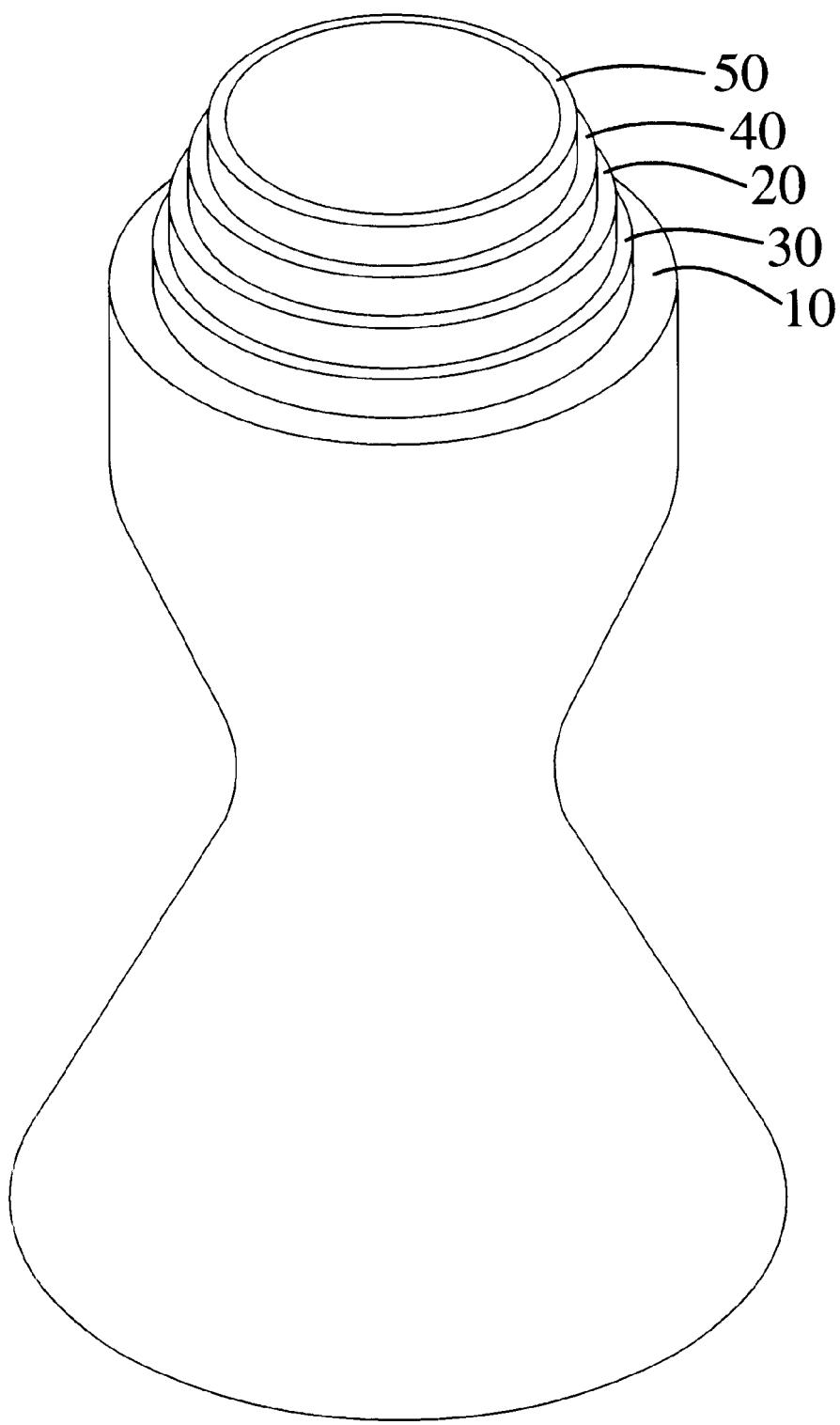
FIG. 4 is an isometric view showing the layered components associated with the combustion chamber lining belonging to a liquid-fueled rocket engine.
Figure 5:
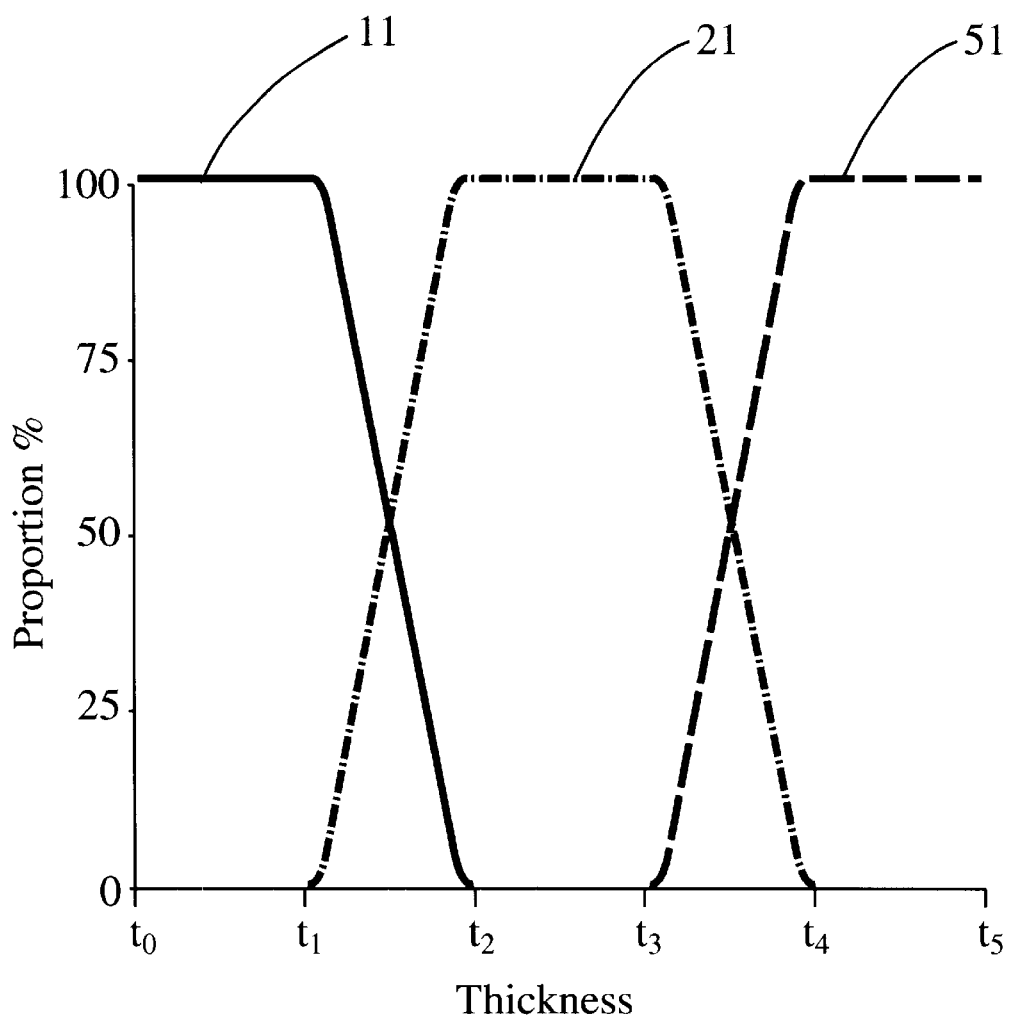
FIG. 5 is a graph showing how the proportions of materials associated with the combustion chamber lining, a first protective coating, and a second protective coating change throughout the respective transitional layers in accordance with the present invention.

FIGS. 4 and 5 represent an alternative embodiment of this invention in which a second transitional layer (40) is attached to the first protective coating (20) and a second protective coating (50) is attached to the second transitional layer (40). Typically, the second protective coating (50) consists of a ceramic or a metallic/ceramic mixture that is attached to the first protective coating (20). A preferred second coating is $ZrO_2$—$8Y_2O_3$. Another preferred second coating is 50% (by weight) $ZrO_2$—$8Y_2O_3$ and 50% (by weight) $R_1CrAlY$.

FIG. 5 is a graphical representation, similar to FIG. 3, showing how the second protective coating (50) is gradiently interlocked to the first protective coating (20). The thickness of the second transitional layer (40) is represented by ($t_3$–$t_4$) on the x-axis and the thickness of the second protective coating (50) is represented by ($t_4$–$t_5$) on the x-axis. A third curve (51) represents various proportions of the second protective coating (50) in this alternative embodiment.

Because of the transitional layers, the present invention is preferably fabricated from the inside to the outside. In other words, the second protective coating, if utilized, is made first; next, the first coating is made; and finally, the lining is made. The preferred process for making this invention comprises the steps of: first, making a second protective coating by applying a second coating material to a mandrel with a forming process; second, making a second transitional layer by gradiently adding a first coating material to the forming process and gradiently deleting the second coating material from the forming process; third, making a first protective coating by applying the first coating material to the second transitional layer with the forming process; fourth, making a first transitional layer by gradiently adding a lining material to the forming process and gradiently deleting the first coating material from the forming process; and finally, making a combustion chamber lining by applying the lining material to the first transitional layer with the forming process. If only a single protective coating is used, then the first two steps in the above procedure are eliminated and the first coating material is applied directly to the mandrel rather than the second transitional layer.

The preferred forming process is a plasmatic spray process that is carried out in a vacuum (also known in the art as the vacuum plasma spray (VPS) process). As indicated, the preferred process produces the transitional layer rather than the traditional material interface (i.e., bond line) of a simple coating. The result is a protective coating with substantially improved integrity against delamination, regardless of the respective coefficients of thermal expansion.

What is claimed is:

1. A combustion chamber for a rocket engine, comprising:
   a lining;
   a first transitional layer, said first transitional layer is attached to said lining; and
   a first protective coating, said first protective coating is attached to said first transitional layer;
   wherein said first transitional layer gradiently interlocks said first protective coating with said lining.

2. A combustion chamber for a rocket engine as recited in claim 1, further comprising:
   a second transitional layer, said second transitional layer is attached to said first coating; and
   a second protective coating, said second protective coating is attached to said second transitional layer.

3. A combustion chamber for a rocket engine as recited in claim 2, wherein said second transitional layer gradiently interlocks said second protective coating with said first protective coating.

4. A combustion chamber for a rocket engine as recited in claim 1, wherein said lining consists essentially of copper.

5. A combustion chamber for a rocket engine as recited in claim 1, wherein said lining consists essentially of:
   60 to 100 percent by weight copper;
   0 to 30 percent by weight chromium;
   0 to 10 percent by weight niobium;
   0 to 4 percent by weight silver; and
   0 to 1 percent by weight zirconium.

6. A combustion chamber for a rocket engine as recited in claim 1, wherein said lining consists essentially of Cu—8Cr—4Nb.

7. A combustion chamber for a rocket engine as recited in claim 1, wherein said first protective coating is a metal.

8. A combustion chamber for a rocket engine as recited in claim 7, wherein said metal consists essentially of:
   0 to 80 percent by weight $R_1$, where $R_1$ is selected from the group consisting of nickel (Ni), cobalt (Co), iron (Fe), or a combination thereof;

15 to 35 percent by weight chromium;

5 to 15 percent by weight aluminum; and 0.1 to 1 percent by weight yttrium.

9. A combustion chamber for a rocket engine as recited in claim 7, wherein said metal consists essentially of Ni—17Cr—6Al—0.5Y.

10. A combustion chamber for a rocket engine as recited in claim 1, wherein said first protective coating is a ceramic.

11. A combustion chamber for a rocket engine as recited in claim 10, wherein said ceramic consists essentially of $ZrO_2$.

12. A combustion chamber for a rocket engine as recited in claim 10, wherein said ceramic consists essentially of $ZrO_2$—$8Y_2O_3$.

13. A combustion chamber for a rocket engine as recited in claim 2, wherein said second protective coating is a ceramic.

14. A combustion chamber for a rocket engine as recited in claim 13, wherein said ceramic consists essentially of $ZrO_2$.

15. A combustion chamber for a rocket engine as recited in claim 13, wherein said ceramic consists essentially of $ZrO_2$—$8Y_2O_3$.

16. A combustion chamber for a rocket engine as recited in claim 2, wherein said second protective coating consists essentially of approximately 50 percent by weight metal alloy and approximately 50 percent by weight ceramic.

17. A combustion chamber for a rocket engine as recited in claim 16, wherein said metal alloy is Ni—17Cr—6Al—0.5Y.

18. A combustion chamber for a rocket engine as recited in claim 16, wherein said ceramic is $ZrO_2$—$8Y_2O_3$.

19. A process for fabricating the rocket engine combustion chamber of claim 1, comprising the steps of:

making a first protective coating by applying a first coating material to a mandrel with a forming process;

making a first transitional layer by gradiently adding a lining material to said forming process and gradiently deleting said first coating material from said forming process; and making a combustion chamber lining by applying said lining material to said first transitional layer with said forming process.

20. A process for fabricating a combustion chamber for a rocket engine as recited in claim 19, wherein said process steps are preceded by:

making a second protective coating by applying a second coating material to a mandrel with a forming process; and making a second transitional layer by gradiently adding said first coating material to said forming process and gradiently deleting said second coating material from said forming process.

21. A high-temperature chamber, comprising:

a lining;

a transitional layer, said transitional layer is attached to said lining; and a protective coating, said protective coating is attached to said transitional layer such that said transitional layer gradiently interlocks said protective coating with said lining.

22. A process for fabricating the high-temperature chamber of claim 21, comprising the steps of:

making a protective coating by applying a coating with a forming process;

making a transitional layer by gradiently adding a lining material to said forming process and gradiently deleting said coating material from said forming process; and making a high-temperature chamber lining by applying said lining material to said transitional layer with said forming process.

* * * * *